US012057073B2

(12) United States Patent
Ge et al.

(10) Patent No.: US 12,057,073 B2
(45) Date of Patent: Aug. 6, 2024

(54) PIXEL CIRCUIT, DRIVING METHOD THEREOF AND DISPLAY APPARATUS

(71) Applicant: XIAMEN TIANMA DISPLAY TECHNOLOGY CO., LTD., Xiamen (CN)

(72) Inventors: Zhiqiang Ge, Xiamen (CN); Jingxiong Zhou, Shanghai (CN); Qicheng Sun, Xiamen (CN)

(73) Assignee: XIAMEN TIANMA DISPLAY TECHNOLOGY CO., LTD., Xiamen (CN)

( * ) Notice: Subject to any disclaimer, the term of this patent is extended or adjusted under 35 U.S.C. 154(b) by 0 days.

(21) Appl. No.: 18/362,994

(22) Filed: Aug. 1, 2023

(65) Prior Publication Data

US 2023/0377519 A1 Nov. 23, 2023

(30) Foreign Application Priority Data

May 25, 2023 (CN) ......................... 202310601749.0

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/06* (2013.01); *G09G 2320/0247* (2013.01)

(58) Field of Classification Search
CPC ...... G09G 3/32–3291; G09G 2300/0421–043; G09G 2300/0819; G09G 2300/0842; G09G 2300/0852; G09G 2300/0861; G09G 2310/0243; G09G 2310/0251; G09G 2310/06; G09G 2310/08; G09G 2320/0204; G09G 2320/0223; G09G 2320/0247; G09G 2320/0257
See application file for complete search history.

(56) References Cited

U.S. PATENT DOCUMENTS

2016/0124491 A1* 5/2016 An ......................... G06F 1/3265
713/323
2020/0403059 A1* 12/2020 Oh ......................... G09G 3/3233
2022/0139307 A1* 5/2022 Zhang .................. G09G 3/3233
345/204

* cited by examiner

*Primary Examiner* — Nathan Danielsen
(74) *Attorney, Agent, or Firm* — KILPATRICK TOWNSEND & STOCKTON LLP

(57) ABSTRACT

A pixel circuit, a driving method thereof, and a display apparatus are provided. The pixel circuit includes a leakage current compensation module, configured to output a leakage current compensation voltage to a gate of a driving transistor at a light-emitting control stage of the pixel circuit, to control a potential change of the gate of the driving transistor to be opposite to a potential change caused by a leakage current at the gate of the driving transistor. At the light-emitting stage, the voltage of the gate of the driving transistor is compensated for by the leakage current compensation module, to compensate for the potential change caused by the leakage current, ensuring high stability of potential at the gate of the driving transistor, making the driving current generated by the driving transistor highly stable, and alleviating the flickering problem when the display apparatus displays images.

17 Claims, 13 Drawing Sheets

PIXEL CIRCUIT, DRIVING METHOD THEREOF AND DISPLAY APPARATUS

CROSS-REFERENCE TO RELATED APPLICATIONS

This application claims benefit of priority from Chinese application NO. 202310601749.0, titled "PIXEL CIRCUIT, DRIVING METHOD THEREOF AND DISPLAY APPARATUS", filed May 25, 2023, with the China National Intellectual Property Administration, the disclosure of which is incorporated herein by reference in its entirety.

FIELD

The present disclosure relates to the field of display technology, and more specifically, to a pixel circuit, a driving method thereof, and a display apparatus.

BACKGROUND

With the development of display technology, the application of display apparatuses has become increasingly more common, and has been gradually applied to people's daily work and life. Among them, OLED (Organic Light-Emitting Diode) display apparatuses have become the mainstream of display panels due to their excellent characteristics such as high contrast, thin thickness, wide viewing angle, fast response speed, wide operating temperature range, and relatively simple structure and manufacturing process.

The frame region of the OLED display apparatus includes a driving circuit, and the display region of the display apparatus includes multiple pixel units. Each pixel unit includes a pixel circuit and a light-emitting element electrically connected to the pixel circuit, where the pixel circuit is electrically connected with the driving circuit in the frame region, and the driving circuit provides an enable signal and the like for the pixel circuit to control the pixel circuit to provide a driving current for the light-emitting element. However, due to the existence of leakage current in the pixel circuit in the current display apparatus, the driving current output by the pixel circuit is unstable, which affects the luminous brightness of the light-emitting element. In particular, with the application of the variable frequency driving technology in the display apparatus, the leakage current of the pixel circuit causes the display apparatus to flicker when displaying images, which affects the user experience.

SUMMARY

In view of this, a pixel circuit, a driving method thereof, and a display apparatus are provided according to the present disclosure, which can effectively solve the existing problems by compensating for the potential change caused by the leakage current at the gate of the driving transistor, to ensure high stability of potential at the gate of the driving transistor, to make the driving current generated by the driving transistor highly stable, and alleviating the flickering problem when the display apparatus displays images.

In order to achieve the above objective, the following embodiments are provided according to the present disclosure.

A pixel circuit includes:

- a driving transistor, configured to generate a driving signal;
- a first reset module, configured to transmit, in response to a first reset control signal at a reset stage of the pixel circuit, a first reset voltage to a gate of the driving transistor;
- a threshold compensation module, configured to electrically connect, in response to a threshold compensation control signal at a data writing stage of the pixel circuit, the gate of the driving transistor to an output terminal of the driving transistor; and
- a leakage current compensation module, configured to output, at a light-emitting control stage of the pixel circuit, a leakage current compensation voltage to the gate of the driving transistor, to control a potential change of the gate of the driving transistor to be opposite to a potential change caused by a leakage current at the gate of the driving transistor.

Accordingly, a driving method for a pixel circuit is further provided according to the present disclosure, which is applied to the above pixel circuit.

The driving method includes:

- outputting, by the leakage current compensation module at a light-emitting control stage of the pixel circuit, a leakage compensation voltage to the gate of the driving transistor, to control a potential change of the gate of the driving transistor to be opposite to a potential change caused by a leakage current at the gate of the driving transistor.

Accordingly, a display apparatus is further provided according to the present disclosure, which includes the above pixel circuit.

The embodiments according to the present disclosure at least have the following beneficial effects over the conventional technology.

A pixel circuit, a driving method thereof and a display apparatus are provided according to the present disclosure. The pixel circuit includes a leakage current compensation module, configured to output, at a light-emitting control stage of the pixel circuit, a leakage current compensation voltage to the gate of the driving transistor, to control a potential change of the gate of the driving transistor to be opposite to a potential change caused by a leakage current at the gate of the driving transistor. As can be seen, according to the embodiments of the present disclosure, at the light-emitting stage, the voltage of the gate of the driving transistor is compensated for by the leakage current compensation module, to compensate for the potential change caused by the leakage current at the gate of the driving transistor, to ensure high stability of potential at the gate of the driving transistor, making the driving current generated by the driving transistor highly stable, and alleviating the flickering problem when the display apparatus displays images.

BRIEF DESCRIPTION OF THE DRAWINGS

For more clearly illustrating embodiments of the present disclosure, the drawing referred to describe the embodiments will be briefly described hereinafter. Apparently, the drawing in the following description is only an example of the present disclosure.

DETAILED DESCRIPTION OF EMBODIMENTS

The embodiments of the present disclosure will be described clearly and completely as follows in conjunction with the drawings in the embodiments of the present disclosure. It is apparent that the described embodiments are only a part of the embodiments according to the present disclosure, rather than all of the embodiments. Any other embodiments, obtained by those in the art based on the embodiments in the present disclosure.

As noted in the background section, the frame region of the OLED display apparatus includes a driving circuit, and the display region of the display apparatus includes multiple pixel units. Each pixel unit includes a pixel circuit and a light-emitting element electrically connected to the pixel circuit, where the pixel circuit is electrically connected with the driving circuit in the frame region, and the driving circuit provides an enable signal and the like for the pixel circuit to control the pixel circuit to provide a driving current for the light-emitting element. However, due to the existence of leakage current in the pixel circuit in the current display apparatus, the driving current output by the pixel circuit is unstable, which affects the luminous brightness of the light-emitting element. In particular, with the application of the variable frequency driving technology in the display apparatus, the leakage current of the pixel circuit causes the display apparatus to flicker when displaying images, which affects the user experience.

In view of this, a pixel circuit, a driving method thereof, and a display apparatus are provided according to the present disclosure, which can effectively solve the existing problems by compensating for the potential change caused by the leakage current at the gate of the driving transistor, to ensure high stability of potential at the gate of the driving transistor, to make the driving current generated by the driving transistor highly stable, and alleviating the flickering problem when the display apparatus displays images.

In order to achieve the above objective, the following embodiments of the present disclosure, which are detailed with reference to FIGS. 1 to 14.

Figure 1:
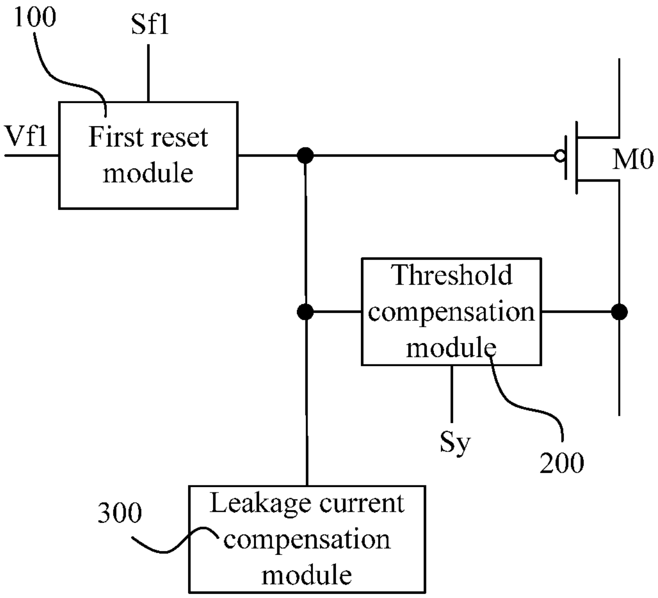
FIG. 1 is a structural diagram of a pixel circuit according to an embodiment of the present disclosure.

Reference is made to FIG. 1, which is a structural diagram of a pixel circuit according to an embodiment of the present disclosure. The pixel circuit includes:

- a driving transistor M0, configured to generate a driving signal;
- a first reset module 100, configured to transmit, in response to a first reset control signal Sf1 at a reset stage of the pixel circuit, a first reset voltage Vf1 to a gate of the driving transistor M0;
- a threshold compensation module 200, configured to electrically connect, in response to a threshold compensation control signal Sy at a data writing stage of the pixel circuit, the gate of the driving transistor M0 to an output terminal of the driving transistor M0; and
- a leakage current compensation module 300, configured to output, at a light-emitting control stage of the pixel circuit, a leakage current compensation voltage to the gate of the driving transistor M0, to control a potential change of the gate of the driving transistor M0 to be opposite to a potential change caused by a leakage current at the gate of the driving transistor M0.

From the above description, in the embodiments according to the present disclosure, at the light-emitting stage, the voltage of the gate of the driving transistor is compensated for by the leakage current compensation module, to compensate for the potential change caused by the leakage current at the gate of the driving transistor, to ensure high stability of potential at the gate of the driving transistor, making the driving current generated by the driving transistor highly stable, and alleviating the flickering problem when the display apparatus displays images.

In an embodiment of the present disclosure, the driving transistor according to the present disclosure may be a P-type transistor or an N-type transistor, which is not limited in the present disclosure. It is understandable that a transistor connected to the gate of the driving transistor introduces leakage current issues to the driving transistor, which changes the potential of the gate of the driving transistor. At the light-emitting stage of the pixel circuit, a data voltage has been written at the gate of the driving transistor, and the leakage current at the gate of the pixel circuit lowers the potential of the gate. In view of this, the leakage current compensation module according to the embodiment of the present disclosure outputs a leakage current compensation voltage, to boost the potential of the gate of the driving transistor for compensation, to ensure high stability of potential at the gate of the driving transistor, making the driving current generated by the driving transistor highly stable, and alleviating the flickering problem when the display apparatus displays images.

It should be noted that the numerical value of the leakage current compensation voltage is not limited in the embodiment of the present disclosure, which may be analyzed and calculated according to practical applications.

Figure 2:
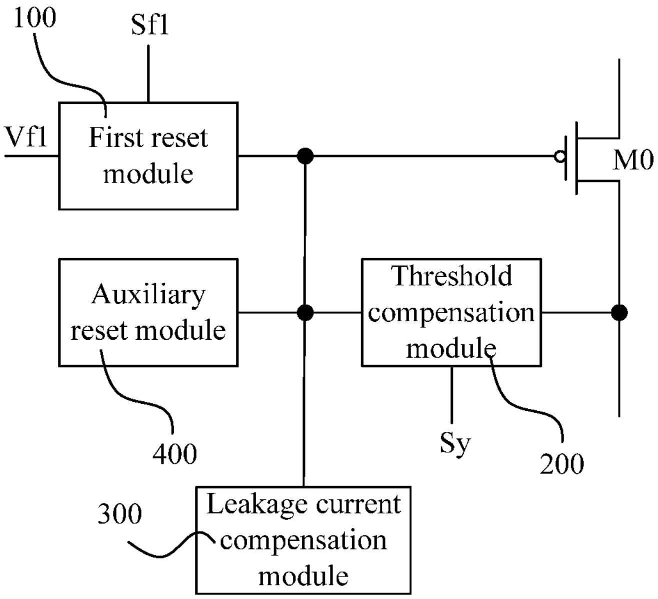
FIG. 2 is a structural diagram of a pixel circuit according to an embodiment of the present disclosure.

In an embodiment of the present disclosure, the pixel circuit can compensate for a leakage current at the gate of the driving transistor, not only at the light-emitting stage but also at the reset stage, to improve the reset effects. Reference is made to FIG. 2, which is a structural diagram of a pixel circuit according to an embodiment of the present disclosure. The pixel circuit further includes: an auxiliary reset module 400, configured to output an auxiliary reset voltage to the gate of the driving transistor M0 at the reset stage, to control the potential change of the gate of the driving transistor M0 to be opposite to a potential change caused by a leakage current at the gate of the driving transistor M0 at the reset stage.

It is understandable that at the reset stage of the pixel circuit, the first reset module transmits the first reset voltage to the gate of the driving transistor for reset, and the first reset voltage may change to result in incomplete reset, as there is a leakage current at the gate of the driving transistor.

In view of this, the auxiliary reset voltage is outputted to the gate of the driving transistor by the auxiliary reset module, to control the potential change of the gate of the driving transistor to be opposite to the potential change caused by the leakage current, to achieve the purpose of compensating for the voltage at the gate of the driving transistor, to improve the reset effects. In a case that the driving transistor is a P-type transistor, the first reset voltage is a negative voltage, and the leakage current at the gate of the driving transistor will increase the numerical value of the first reset voltage. The first reset voltage at the gate of the driving transistor is reduced by compensation of the auxiliary reset voltage, to ensure good reset effects.

By analogy, in a case that the driving transistor is an N-type transistor, the first reset voltage is a positive voltage, and the leakage current at the gate of the driving transistor will reduce the numerical value of the first reset voltage. The first reset voltage at the gate of the driving transistor is increased by compensation of the auxiliary reset voltage, to ensure good reset effects.

It should be noted that the numerical value of the auxiliary reset voltage is not limited in the embodiment of the present disclosure, which may be analyzed and calculated according to practical applications.

Figure 3:
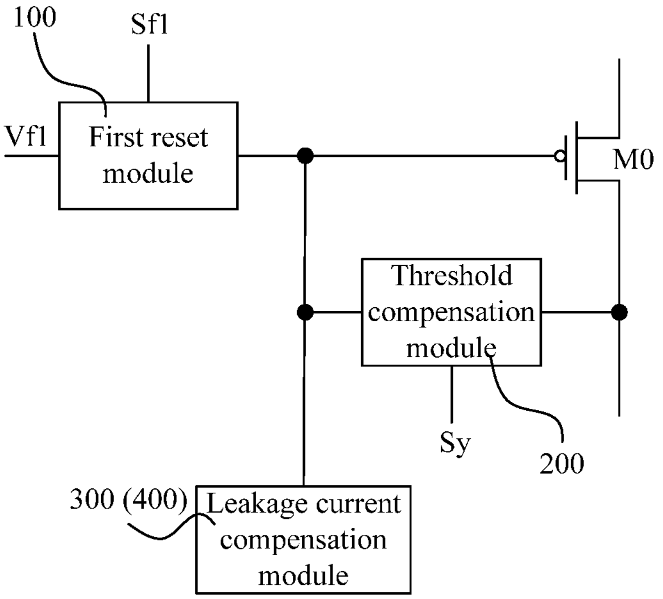
FIG. 3 is a structural diagram of a pixel circuit according to an embodiment of the present disclosure.

Reference is made to FIG. 3, which is a structural diagram of a pixel circuit according to an embodiment of the present disclosure. According to an embodiment of the present disclosure, the leakage current compensation module 300 may be reused as the auxiliary reset module 400, where the leakage current compensation module 300 outputs the auxiliary reset voltage at the reset stage, and outputs the leakage current compensation voltage at the light-emitting control stage.

It is understandable that according to the embodiment of the present disclosure, the auxiliary reset module operates at the reset stage, and the leakage current compensation module operates at the light-emitting control stage. As they operate in different time periods, the leakage current compensation module can be reused as the auxiliary reset module. The reused leakage current compensation module operates in a time division manner, which outputs a reset voltage to the gate of the driving transistor at the reset stage, outputs the leakage current compensation voltage to the gate of the driving transistor at the light-emitting control stage, and is set afloat at the data writing stage, to achieve the compensation function at the reset stage and the light-emitting control stage, to reduce the number of modules in the pixel circuit and simplifying the structure of the pixel circuit.

Figure 4:
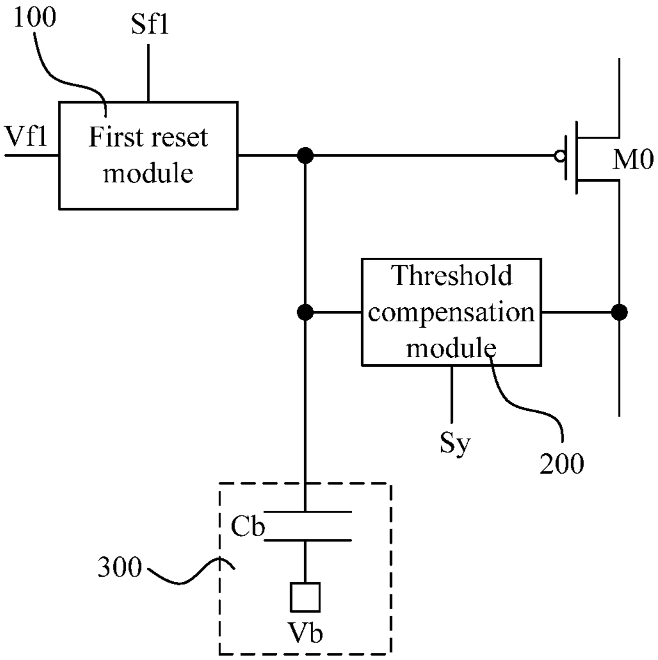
FIG. 4 is a structural diagram of a pixel circuit according to an embodiment of the present disclosure.

In an embodiment of the present disclosure, the leakage current compensation module may change the voltage of the gate of the driving transistor by a capacitor. Reference is made to FIG. 4, which is a structural diagram of a pixel circuit according to an embodiment of the present disclosure. The leakage current compensation module 300 includes a compensation capacitor Cb and a compensation voltage terminal Vb. A first electrode of the compensation capacitor Cb is electrically connected to the gate of the driving transistor M0, and a second electrode of the compensation capacitor Cb is electrically connected to the compensation voltage terminal Vb.

It is understandable that the leakage current compensation module according to an embodiment of the present disclosure couples, by coupling of the compensation capacitor, a voltage outputted by the compensation voltage terminal to the gate of the driving transistor, to compensate for the voltage at the gate of the driving transistor. In a case that the driving transistor is a P-type transistor and the leakage current compensation module is reused as the auxiliary reset module, the compensation voltage terminal outputs a high level voltage at the reset stage, to compensate for the increase of the first reset voltage at the gate of the driving transistor due to the leakage current, to lower the first reset voltage at the gate of the driving transistor, ensuring the reset effects. At the light-emitting control stage, the compensation voltage terminal outputs a low level voltage, to compensate for the decrease of the data voltage included at the gate of the driving transistor due to the leakage current, to boost the data voltage at the gate of the driving transistor, ensuring that the driving current generated by the driving transistor is accurate and stable, improving light-emitting effects of light-emitting elements, and improving display effects of the display apparatus.

By analogy, in a case that the driving transistor is an N-type transistor and the leakage current compensation module is reused as the auxiliary reset module, by the voltage outputted by the compensation voltage terminal and the coupling of the compensation capacitor, the first reset voltage at the gate of the driving resistor is compensated for at the reset stage, and the data voltage included at the gate of the driving transistor is compensated for at the light-emitting stage, to improve the display effects of the display apparatus.

It should be noted that the numerical value of the voltage outputted by the compensation voltage terminal is not limited in the embodiment of the present disclosure, which may be analyzed and calculated according to practical applications, and that the compensation voltage terminal according to the embodiment of the present disclosure may be an independent voltage terminal, or integrated into a driving chip of the display apparatus, which is not limited in the present disclosure.

Figure 5:
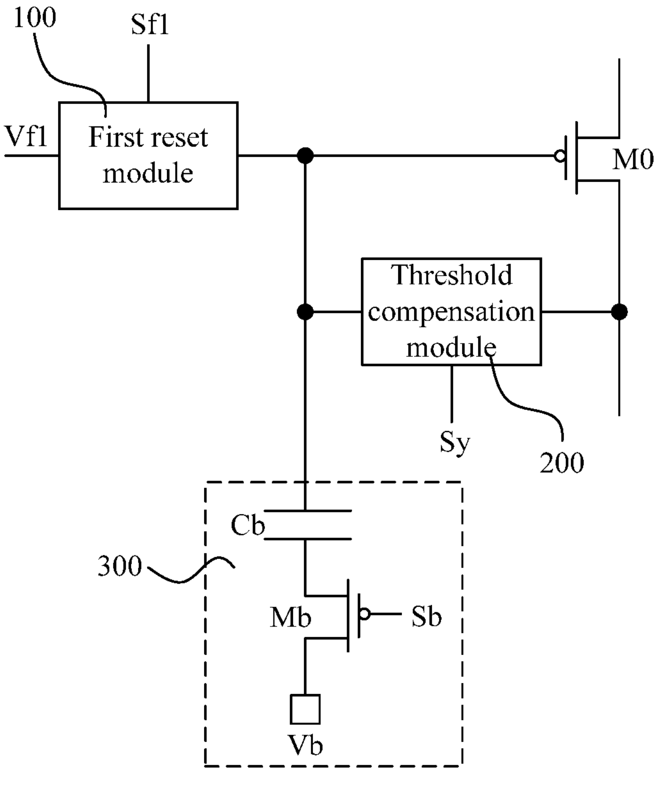
FIG. 5 is a structural diagram of a pixel circuit according to an embodiment of the present disclosure.

Further, a controllable switch may be provided between the compensation voltage terminal and the compensation capacitor. The controllable switch may be turned on when the leakage current compensation module operates, and turned off when the leakage current compensation module is afloat, which avoids the circumstance that when the leakage current compensation module is afloat, the compensation capacitor couples an extra voltage to the gate of the driving transistor due to failure of the compensation voltage terminal to timely stop outputting a voltage. Reference is made to FIG. 5, which is a structural diagram of a pixel circuit according to an embodiment of the present disclosure. The leakage current compensation module 300 further includes a compensation transistor Mb electrically connected between the compensation capacitor Cb and the compensation voltage terminal Vb. A first terminal of the compensation transistor Mb is electrically connected to the compensation voltage terminal Vb, a second terminal of the compensation transistor Mb is electrically connected to the second electrode of the compensation capacitor Cb, and a gate of the compensation transistor Mb is provided with a compensation control signal Sb.

It is understandable that in a case that the leakage current compensation module is reused as the auxiliary reset module, the compensation transistor is turned on in response to the compensation control signal at the reset stage, turned on in response to the compensation control signal at the light-emitting control stage, and turned off in response to the compensation control signal at the data writing stage. In an embodiment, in a case that the leakage current compensation module is not reused as the auxiliary reset module and the compensation transistor has the same conduction type as a light-emitting control transistor in a light-emitting control module, a light-emitting control signal may be reused as the compensation control signal, to reduce the number of signal terminals and simplifying the pixel circuit.

In an embodiment of the present disclosure, a voltage value outputted by the compensation voltage terminal according to the present disclosure may be fixed. That is, throughout a first light-emitting control stage to an $N^{th}$ light-emitting control stage of the pixel circuit, voltage values outputted by the compensation voltage terminal in the respective stages are the same, where N is an integer greater than or equal to 2. It is understandable that in a display process from power-on to power-off of the display apparatus, the pixel circuit performs N light-emitting control stages, and the voltage value outputted by the compensation voltage terminal during each light-emitting control stage is the same, to avoid the increase of power consumption due to change of the voltage value outputted by the compensation voltage terminal. Accordingly, in a case that the leakage current compensation module is reused as the auxiliary reset module, a voltage value outputted by the compensation voltage terminal at each reset stage may also be the same, which is not limited in the present disclosure.

In one embodiment, the voltage value outputted by the compensation voltage terminal according to an embodiment of the present disclosure may vary. That is, throughout the first light-emitting control stage to the $N^{th}$ light-emitting control stage of the pixel circuit, the voltage value outputted by the compensation voltage terminal at an $i^{th}$ light-emitting control stage is an $i^{th}$ voltage value, where the $i^{th}$ voltage value is determined by the voltage of the gate of the driving transistor at the $i^{th}$ light-emitting control stage. It is understandable that in a display process from power-on to power-off of the display apparatus, the pixel circuit performs N light-emitting control stages, and the voltage value outputted by the compensation voltage terminal at each light-emitting control stage is determined according to the voltage at the gate of the driving transistor. That is, the compensation voltage terminal outputs a corresponding voltage according to the change of the voltage at the gate of the driving transistor at the light-emitting control stage, and the change of the voltage at the gate of the driving transistor is compensated for by the coupling of the capacitor, to more accurately compensate for the voltage at the gate of the driving transistor. Accordingly, in a case that the leakage current compensation module is reused as the auxiliary reset module, a voltage value outputted by the compensation voltage terminal at each reset stage may also be determined according to the voltage at the gate of the driving transistor, which is not limited in the present disclosure.

Figure 6:
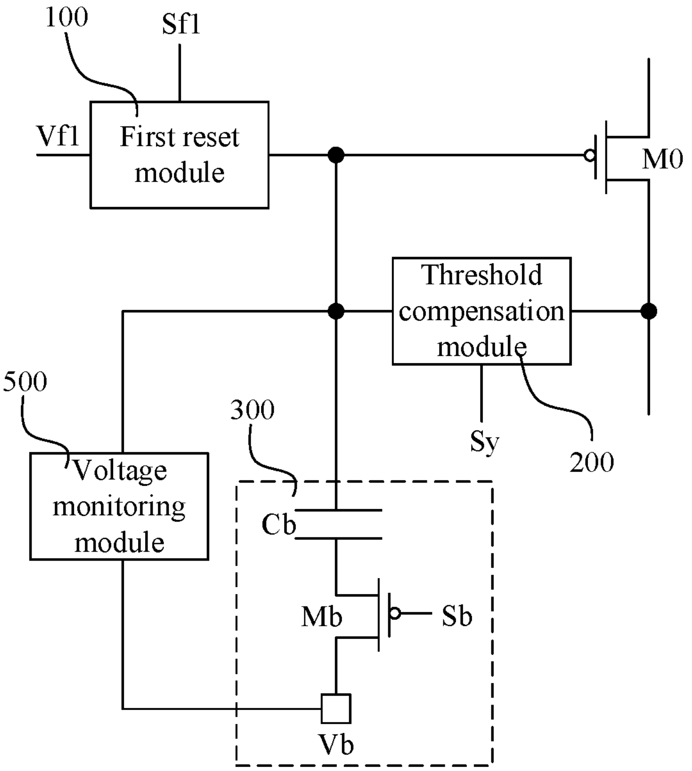
FIG. 6 is a structural diagram of a pixel circuit according to an embodiment of the present disclosure.

To monitor the voltage at the gate of the driving transistor to determine the voltage value outputted by the compensation voltage terminal, the pixel circuit according to an embodiment of the present disclosure further includes a voltage monitoring module. Reference is made to FIG. 6, which is a structural diagram of a pixel circuit according to an embodiment of the present disclosure. The pixel circuit further includes: a voltage monitoring module 500 electrically connected to the gate of the driving transistor M0 and the compensation voltage terminal Vb, and configured to monitor the voltage of the gate of the driving transistor M0 at the light-emitting control stage and transmit the monitored voltage to the compensation voltage terminal Vb, where the compensation voltage terminal Vb outputs a corresponding voltage to the compensation capacitor Cb according to the monitored voltage.

It is understandable that the voltage monitoring module according to the embodiment of the present disclosure is electrically connected to the gate of the driving transistor, and to monitor the voltage at the gate of the driving transistor. Further, the voltage monitoring module is further electrically connected to the compensation voltage terminal, and transmits the monitored voltage to the compensation voltage terminal, and the compensation voltage terminal can determine, according to the monitored voltage, a voltage value to be outputted. Accordingly, in a case that the leakage current compensation module is reused as the auxiliary reset module, the voltage monitoring module can also monitor the voltage of the gate of the driving transistor at the reset stage, and transmit the monitored voltage to the compensation voltage terminal, and the compensation voltage terminal can determine, according to the monitored voltage, a voltage value to be outputted, to compensate for the voltage at the gate of the driving transistor at the reset stage.

In an embodiment of the present disclosure, the display apparatus according to the present disclosure includes multiple pixel circuits, and voltage monitoring modules of all the pixel circuits may be provided as one voltage monitoring module, to simplify circuit structure of the display apparatus and increasing the area for wiring. The voltage monitoring module according to the embodiment of the present disclosure may be an independent circuit structure of the pixel circuit, or integrated into the driving chip of the display apparatus, which is not limited in the present disclosure.

Figure 7:
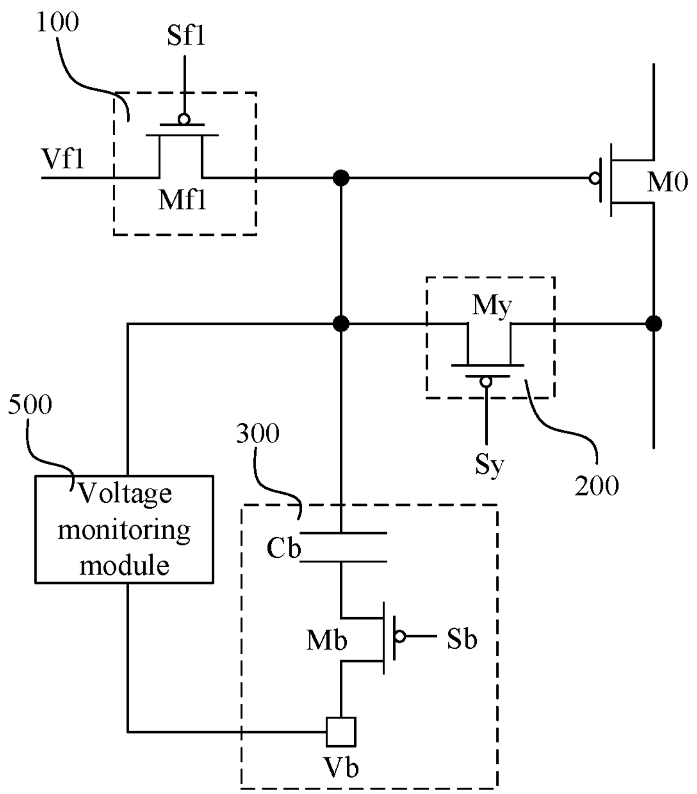
FIG. 7 is a structural diagram of a pixel circuit according to an embodiment of the present disclosure.

Reference is made to FIG. 7, which is a structural diagram of a pixel circuit according to an embodiment of the present disclosure. The first reset module 100 according to an embodiment of the present disclosure includes a first reset transistor Mf1, where a first terminal of the first reset transistor Mf1 is provided with a first reset voltage Vf1, a gate of the first reset transistor Mf1 is provided with a first reset control signal Sf1, and a second terminal of the first reset transistor Mf1 is electrically connected to the gate of the driving transistor M0.

The threshold compensation module 200 includes a threshold compensation transistor My, where a first terminal of the threshold compensation transistor My is electrically connected to the gate of the driving transistor M0, a second terminal of the threshold compensation transistor My is electrically connected to an output terminal of the driving transistor M0, and a gate of the threshold compensation transistor My is provided with the threshold compensation control signal Sy.

It is understandable that in the pixel circuit according to the embodiment of the present disclosure, at the reset stage, the first reset control signal enables the first reset transistor to be turned on, and the first reset transistor transmits the first reset voltage to the gate of the driving transistor for reset; at the data writing stage, the threshold compensation control signal enables the threshold compensation transistor to be turned on, and the threshold compensation transistor connects the gate of the driving transistor to the output terminal of the driving transistor. In an embodiment, the first reset transistor and the threshold compensation transistor may be an N-type transistor or a P-type transistor, which is not limited in the present disclosure.

Figure 8:
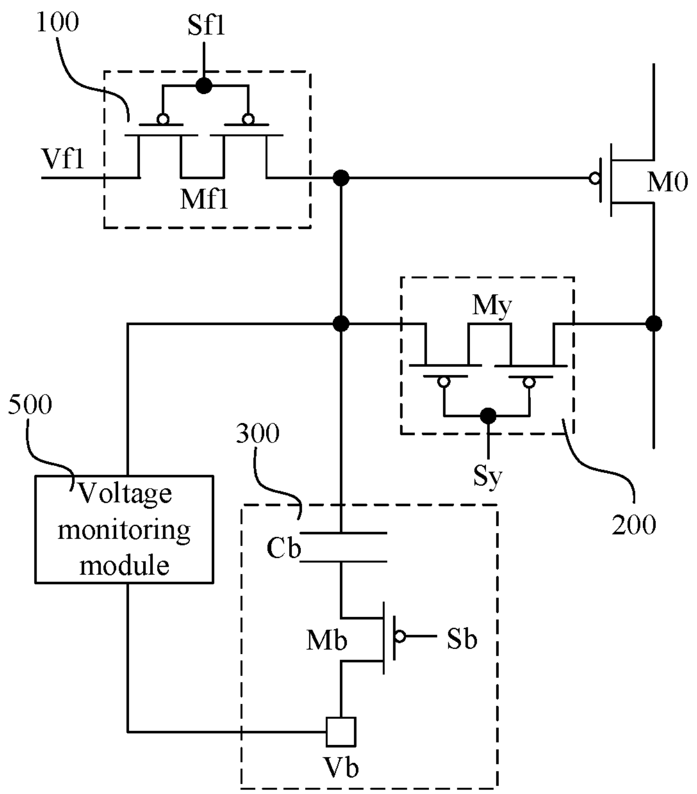
FIG. 8 is a structural diagram of a pixel circuit according to an embodiment of the present disclosure.

Reference is made to FIG. 8, which is a structural diagram of a pixel circuit according to an embodiment of the present disclosure. The first reset transistor Mf1 and/or the threshold compensation transistor My according to an embodiment of the present disclosure may be a dual-gate transistor, to improve the response speed of the reset module and the threshold compensation module and improves the performance of the pixel circuit.

The first reset transistor and/or the threshold compensation transistor according to an embodiment of the present disclosure may be an oxide transistor, which can further reduce impact of the first reset transistor and the threshold compensation transistor on the leakage current at the gate of the driving transistor, ensuring the performance of the pixel circuit.

Figure 9:
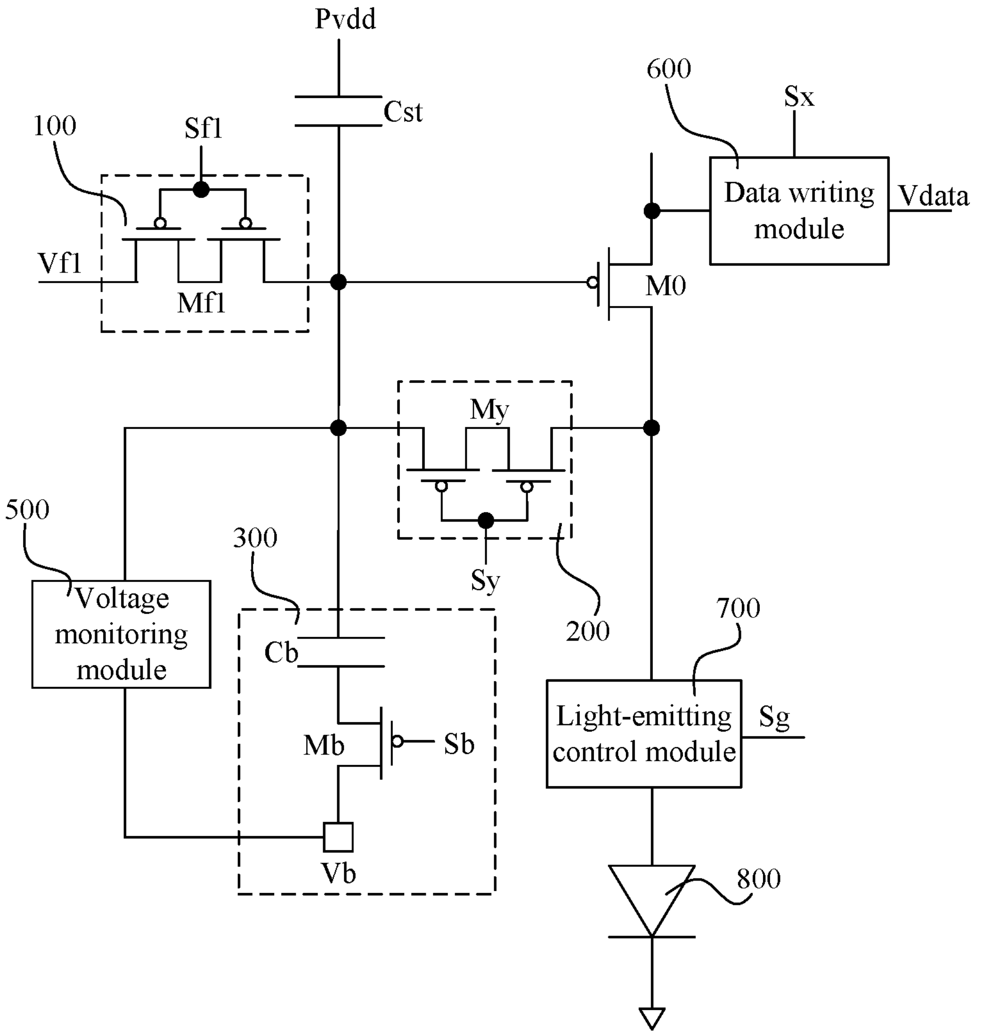
FIG. 9 is a structural diagram of a pixel circuit according to an embodiment of the present disclosure.

Reference is made to FIG. 9, which is a structural diagram of a pixel circuit according to an embodiment of the present disclosure. The pixel circuit according to an embodiment of the present disclosure includes a data writing module 600, a light-emitting control module 700 and a storage capacitor Cst. The data writing module 600 is configured to transmit, in response to a data writing control signal Sx at the data writing stage, the data voltage Vdata to an input terminal of the driving transistor M0. The light-emitting control module 700 is configured to transmit, in response to a light-emitting control signal Sg at the light-emitting stage, the driving signal generated by the driving transistor M0 to a light-emitting element 800, and the light-emitting element 800 emits light in response to the driving signal. A first electrode of the storage capacitor Cst is provided with a power supply voltage Pvdd, and a second electrode of the storage capacitor Cst is electrically connected to the gate of the driving transistor M0.

Figure 10:
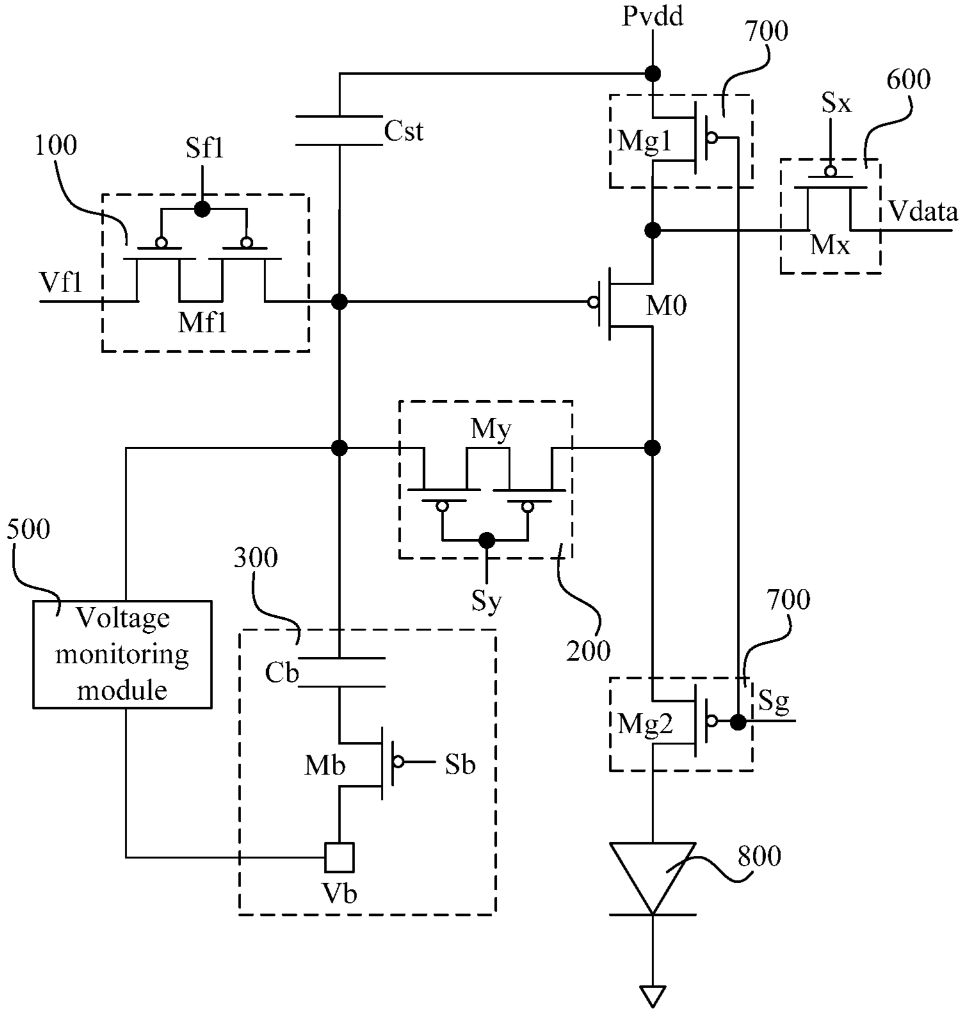
FIG. 10 is a structural diagram of a pixel circuit according to an embodiment of the present disclosure.

Reference is made to FIG. 10, which is a structural diagram of a pixel circuit according to an embodiment of the present disclosure. The data writing module 600 according to an embodiment of the present disclosure includes a data writing transistor Mx, where a first terminal of the data writing transistor Mx is provided with the data voltage Vdata, a second terminal of the data writing transistor Mx is electrically connected to the input terminal of the driving transistor M0, and a gate of the data writing transistor Mx is provided with the data writing control signal Sx.

The light-emitting control module 700 includes a first light-emitting control transistor Mg1 and a second light-emitting control transistor Mg2. A first terminal of the first light-emitting control transistor Mg1 is provided with the power supply voltage Pvdd, a second terminal of the first light-emitting control transistor Mg1 is electrically connected to the input terminal of the driving transistor M0, and a gate of the first light-emitting control transistor Mg1 is provided with the light-emitting control signal Sg. A first terminal of the second light-emitting control transistor Mg2 is electrically connected to the output terminal of the driving transistor M0, a second terminal of the second light-emitting control transistor Mg2 is electrically connected to the light-emitting element 800, and a gate of the second light-emitting control transistor Mg2 is provided with the light-emitting control signal Sg.

In an embodiment of the present disclosure, the data writing transistor and the threshold compensation transistor has the same conduction type, and the data writing control signal and the threshold compensation control signal may be one control signal, to reduce the number of signal terminals and simplify the wiring of the pixel circuit.

A capacitance of the compensation capacitor may be less than that of the storage capacitor according to an embodiment of the present disclosure, to improve charging and discharging efficiency of the storage capacitor, and improving compensation efficiency for the voltage at the gate of the driving transistor.

Figure 11:
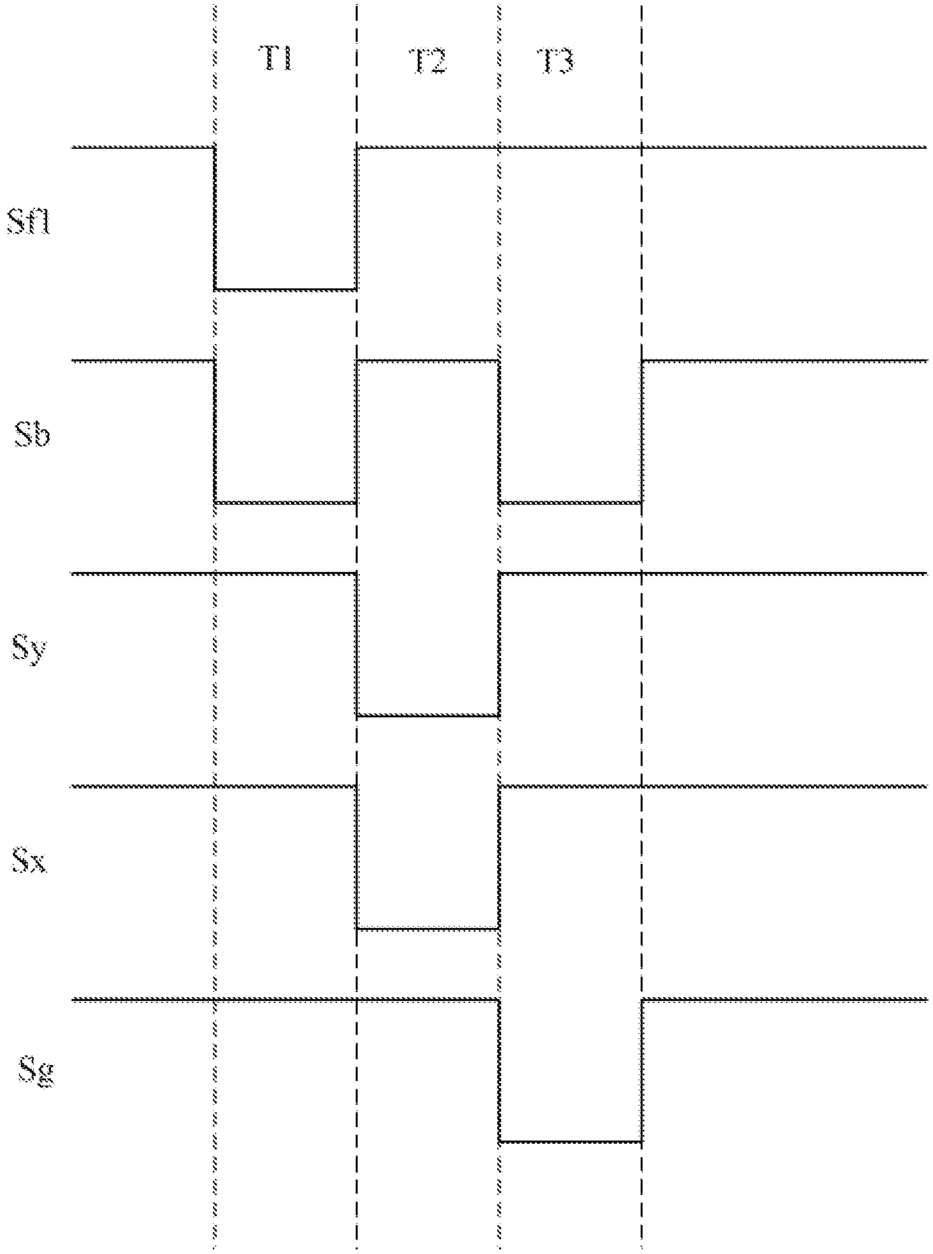
FIG. 11 is a timing sequence diagram according to an embodiment of the present disclosure.

The pixel circuit according to the embodiment of the present disclosure is described in more detail with reference to a timing sequence diagram. It should be noted that the following description is made with all the transistors being P-type transistors and the leakage current compensation module being reused as the auxiliary reset module for example. Reference is made FIGS. 10 and 11, where FIG. 11 is a timing sequence diagram according to an embodiment of the present disclosure. The operation process of the pixel circuit according to an embodiment of the present disclosure includes a reset stage T1, a data writing stage T2 and a light-emitting control stage T3 which are performed in the sequence as listed.

At the reset stage T1, the first reset control signal Sf1 and the compensation control signal Sb are enabling low level, and the first reset transistor Mf1 is turned on to transmit the first reset voltage Vf1 to the gate of the driving transistor M0; the voltage monitoring module 500 monitors the voltage at the driving transistor M0, and transmits the monitored voltage to the compensation voltage terminal Vb; the compensation voltage terminal Vb outputs a corresponding voltage value according to the monitored voltage, the compensation transistor Mb transmits a voltage to the compensation capacitor Cb, and the auxiliary reset voltage is transmitted to the gate of the driving transistor M0 via the coupling of the compensation capacitor Cb for compensation, to improve the reset effects at the gate of the driving transistor. In this case, the threshold compensation control signal Sy, the data writing control signal Sx and the light-emitting control signal Sg are non-enabling high level.

At the data writing stage T2, the threshold compensation control signal Sy and the data writing control signal Sx are enabling low level, and the threshold compensation transistor My is turned on to connect the gate of the driving transistor M0 and the output terminal of the driving transistor M0; the data writing transistor Mx is turned on to transmit the data voltage Vdata to the input terminal of the driving transistor M0, and the data voltage Vdata is written into the gate of the driving transistor M0 after passing through the driving transistor M0 and the threshold compensation transistor My. In this case, the first reset control signal Sf1, the compensation control signal Sb and the light-emitting control signal Sg are non-enabling high level.

At the light-emitting stage T3, the light-emitting control signal Sg and the compensation control signal Sb are enabling low level, the first light-emitting control transistor Mg1 and the second light-emitting control transistor Mg2 are turned on, and transmit a driving current generated by the driving transistor M0 to the light-emitting element 800; meanwhile, the voltage monitoring module 500 monitors the voltage at the driving transistor M0, and transmits the monitored voltage to the compensation voltage terminal Vb; the compensation voltage terminal Vb determines a corresponding voltage value according to the monitored voltage, and the compensation transistor Mb transmits a voltage to the compensation capacitor Cb, and the leakage current compensation voltage is transmitted to the gate of the driving transistor M0 via the coupling of the compensation capacitor Cb for compensation, to ensure the accuracy and high stability of the data voltage included at the gate of the driving transistor M0, to guarantee accuracy and high stability of the driving current and improving stability of light-emitting brightness of the light-emitting element. In this case, the first reset control signal Sf1, the threshold compensation control signal Sy and the data writing control signal Sx are non-enabling high level.

Figure 12:
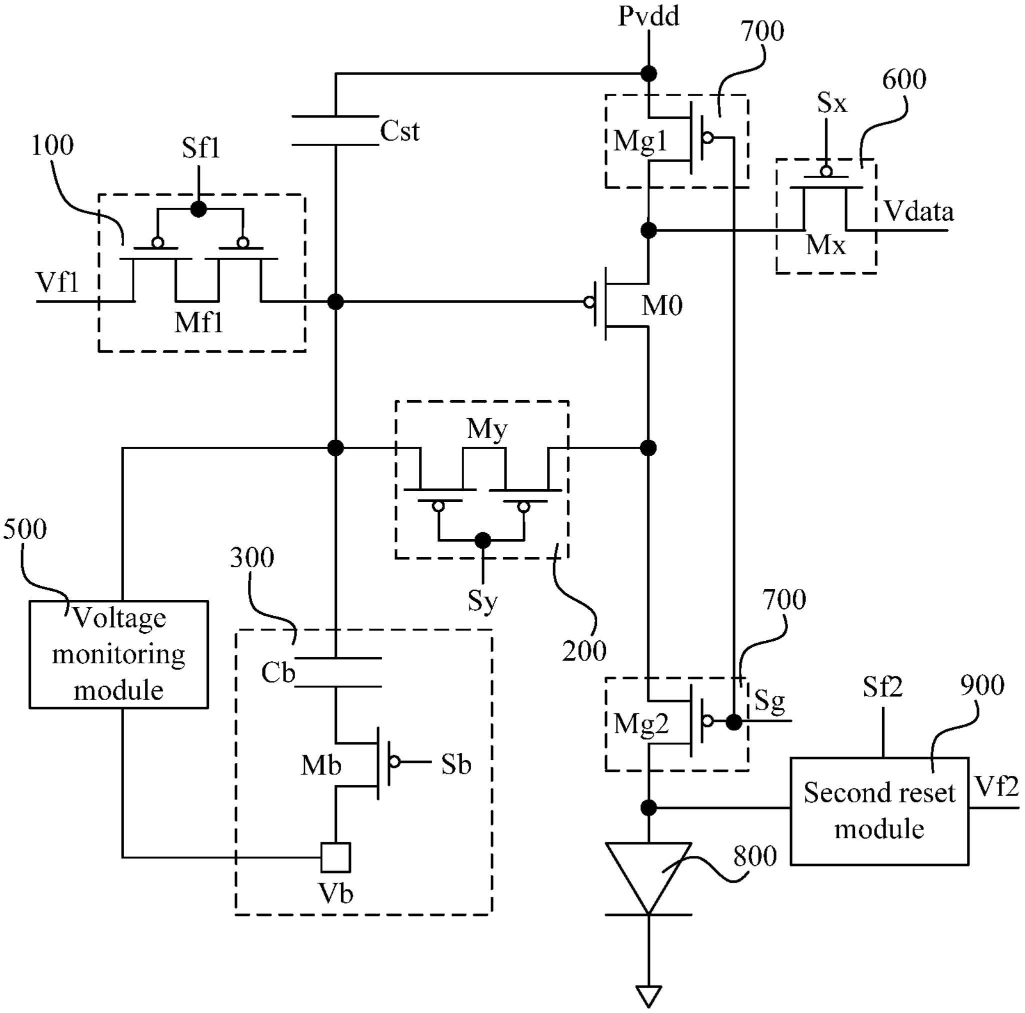
FIG. 12 is a structural diagram of a pixel circuit according to an embodiment of the present disclosure.

Further, the pixel circuit according to an embodiment of the present disclosure may reset the light-emitting element. Reference is made to FIG. 12, which is a structural diagram of a pixel circuit according to an embodiment of the present disclosure. The pixel circuit further includes a second reset module 900, configured to transmit, in response to a second reset control signal Sf2 at the reset stage, a second reset voltage Vf2 to a connection terminal of the light-emitting control module 700 and the light-emitting element 800.

It is understandable that the second reset module according to the embodiment of the present disclosure can reset the connection terminal of the light-emitting element and the light-emitting control module, which can avoid the circumstance that the light-emitting element is not dark in a dark mode.

Figure 13:
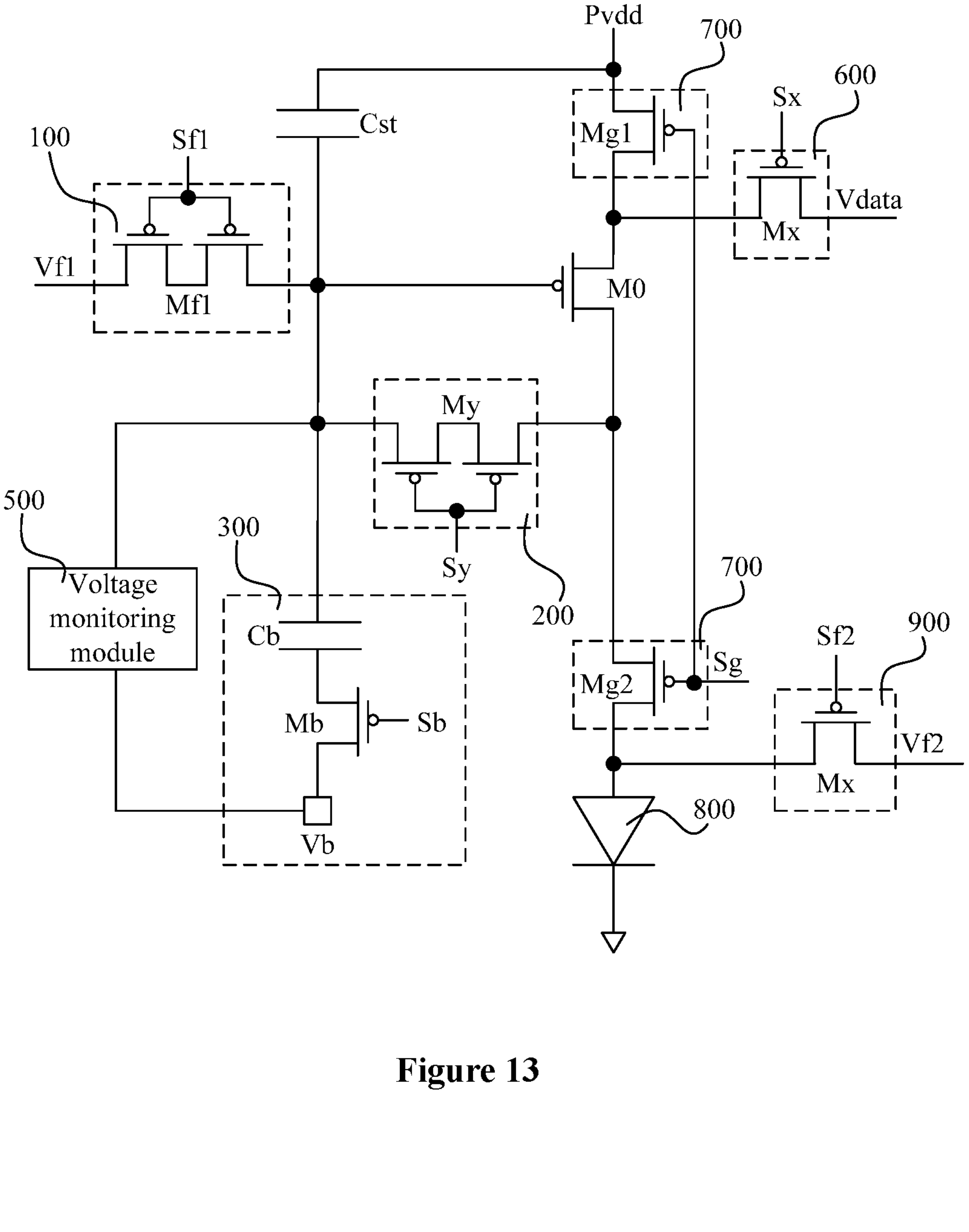
FIG. 13 is a structural diagram of a pixel circuit according to an embodiment of the present disclosure.

Reference is made to FIG. 13, which is a structural diagram of a pixel circuit according to an embodiment of the present disclosure. The second reset module 900 according to the embodiment of the present disclosure includes a second reset transistor Mf2, where a first terminal of the second reset transistor Mf2 is provided with the second reset voltage Vf2, a second terminal of the second reset transistor Mf2 is electrically connected to the connection terminal of the light-emitting control module 700 and the light-emitting element 800, and a gate of the second reset transistor Mf2 is provided with the second reset control signal Sf2.

In an embodiment, in a case that the second reset transistor and the first reset transistor have the same conduction type, the second reset control signal and the first reset control signal may be one control signal since the second reset transistor and the first reset transistor are both turned on at the reset stage. Further, the first reset voltage and the second reset voltage may be outputted by one voltage terminal, which reduces the number of signal terminals and simplifies the wiring of the pixel circuit.

Accordingly, a driving method for a pixel circuit is further provided according to the present disclosure, applied to the pixel circuit according to any of the above embodiments.

The driving method includes:

outputting, by the leakage current compensation module at a light-emitting control stage of the pixel circuit, a leakage compensation voltage to the gate of the driving transistor, to control a potential change of the gate of the driving transistor to be opposite to a potential change caused by a leakage current at the gate of the driving transistor.

It is understandable that at the light-emitting stage, the voltage of the gate of the driving transistor is compensated for by the leakage current compensation module, to compensate for the potential change caused by the leakage current at the gate of the driving transistor, to ensure high stability of potential at the gate of the driving transistor, making the driving current generated by the driving transistor highly stable, and alleviating the flickering problem when the display apparatus displays images.

In an embodiment, the driving method according to the present disclosure includes a reset stage, a data writing stage and a light-emitting control stage that are performed in the sequence as listed.

At the reset stage, the first reset control signal enters an enabling stage, and controls the first reset module to transmit the first reset voltage to the gate of the driving transistor.

At the data writing stage, the threshold compensation control signal enters an enabling stage, and controls the threshold compensation module to electrically connect the gate of the driving transistor to the output terminal of the driving transistor.

At the light-emitting stage, the driving transistor generates the driving signal, and the leakage current compensation module outputs the leakage current compensation voltage to the gate of the driving transistor.

It should be noted that reference may be made to the description of the reset stage, the data writing stage and the light-emitting control stage in conjunction with the above FIGS. 10 and 11 for the driving method according to the embodiment of the present disclosure, which is not repeated herein.

In an embodiment of the present disclosure, the pixel circuit according to the present disclosure may further includes an auxiliary reset module. At the reset stage, the auxiliary reset module is configured to output an auxiliary reset voltage to the gate of the driving transistor, to control the potential change of the gate of the driving transistor to be opposite to a potential change caused by a leakage current at the gate of the driving transistor. In an embodiment according to the present disclosure, the leakage current compensation module may be reused as the auxiliary reset module. Thus, at the reset stage, the leakage current compensation module can output the auxiliary reset voltage to the gate of the driving transistor, to improve the reset effects.

Accordingly, a display apparatus is further provided according to the present disclosure, which includes the pixel circuit according to any of the above embodiments.

Figure 14:
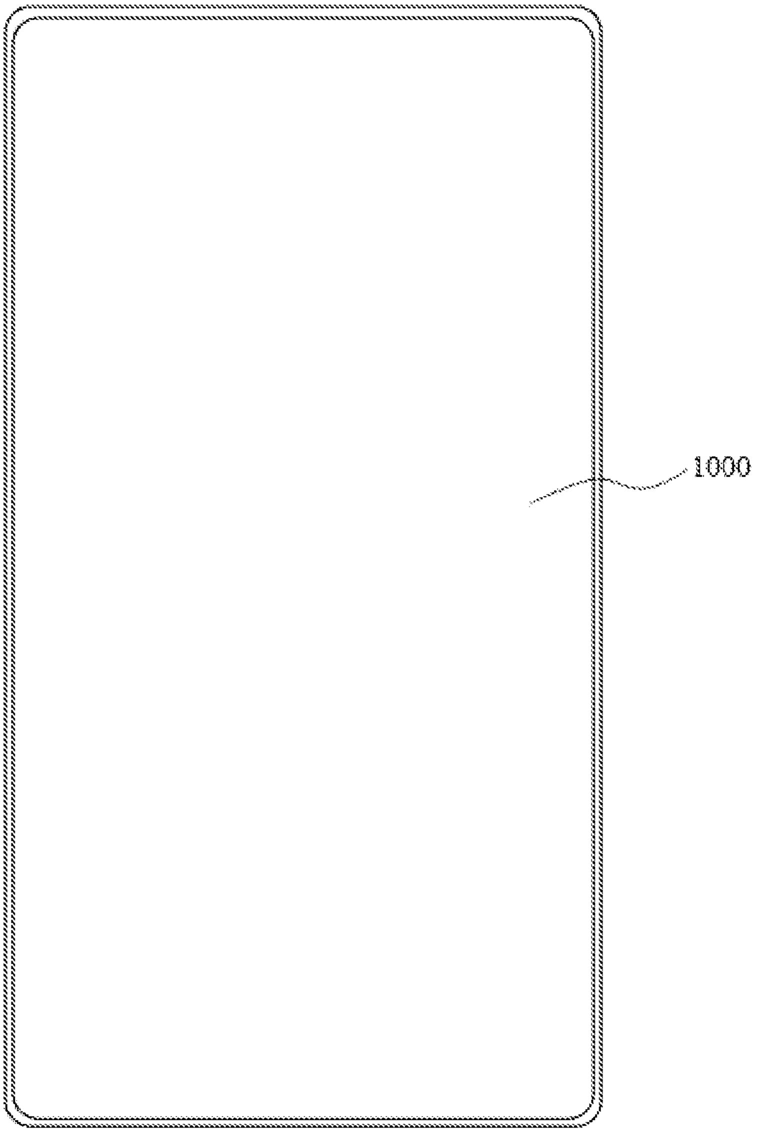
FIG. 14 is a structural diagram of a display apparatus according to an embodiment of the present disclosure.

Reference is made to FIG. 14, which is a structural diagram of a display apparatus according to an embodiment of the present disclosure. The display apparatus 100 according to the embodiment of the present disclosure may be a mobile terminal, and includes the pixel circuit according to any of the above embodiments.

It should be noted that the display apparatus according to the embodiment of the present disclosure may alternatively be a laptop computer, a tablet computer, a computer, a wearable device, which is not limited in the present disclosure.

A pixel circuit, a driving method thereof and a display apparatus are provided according to the embodiments of the present disclosure. The pixel circuit includes a leakage current compensation module, configured to output, at a light-emitting control stage of the pixel circuit, a leakage current compensation voltage to the gate of the driving transistor, to control a potential change of the gate of the driving transistor to be opposite to a potential change caused by a leakage current at the gate of the driving transistor. As can be seen, according to the embodiments of the present disclosure, at the light-emitting stage, the voltage of the gate of the driving transistor is compensated for by the leakage current compensation module, to compensate for the potential change caused by the leakage current at the gate of the driving transistor, to ensure high stability of potential at the gate of the driving transistor, making the driving current generated by the driving transistor highly stable, and alleviating the flickering problem when the display apparatus displays images.

In descriptions of the present disclosure, it is to be understood that the terms “central”, “longitudinal”, “transverse”, “length”, “width”, “thickness”, “upper”, “lower”, “front”, “back”, “left”, “right”, “vertical”, “horizontal”, “top”, “bottom”, “inner”, “outer”, “clockwise”, “counter-clockwise”, “axial”, “radial”, “circumferential” and other indicated orientations or positional relationships are based on the orientations or positional relationships shown in the drawings, which are only for the convenience of describing the present disclosure and simplifying the description, rather than indicating or implying the device or element must have a specific orientation, be constructed, and operate in a specific orientation, and therefore should not be construed as limiting the disclosure.

In addition, terms such as "first" and "second" are used for descriptive purposes only, and cannot be understood as indicating or implying relative importance or implicitly specifying the quantity of indicated features. Thus, the features defined by "first" and "second" may explicitly or implicitly include at least one of these features. In the description of the present disclosure, "plurality" means at least two, such as two, three, etc., unless otherwise specifically defined.

In the present disclosure, unless otherwise clearly specified and limited, such terms as "installation", "connection", "connection", "fixation" and other terms should be understood in a broad sense. For example, there may be a fixed connection, a detachable connection, or integration; or there may be a mechanical connection, an electrical connection or a mutual communication; there may be a direction connection, an indirect connection through an intermediary, an internal communication of two components or an interaction of the two components, unless expressly defined otherwise. The specific meanings of the above terms in the present disclosure according to specific situations.

In the present disclosure, unless otherwise clearly specified and limited, in a case that a first feature is "above" or "under" a second feature, the first feature may be in direct contact with the second feature, or the first and second features may be in indirect contact via an intermediary. In one embodiment, in a case that the first feature is "on", "above" or "over" the second feature, the first feature may be right above the second feature or obliquely above the second feature, or it merely indicates that the first feature has a horizontal height larger than that of the second feature. In a case that the first feature is "beneath", "below" or "under" the second feature, the first feature may right below the second feature or obliquely below the second feature, or it merely indicates that the first feature has a horizontal height smaller than that of the second feature.

In the present disclosure, the terms "one embodiment", "some embodiments", "example", "specific examples", or "some examples" indicate that specific features, structures, materials or characteristics described in conjunction with the embodiment or examples are included in at least one embodiment or example of the present disclosure. In this specification, the schematic expression of the above terms is not necessarily directed to the same embodiment or example. Furthermore, the described specific features, structures, materials or characteristics may be combined in any suitable manner in any one or more embodiments or examples. In addition, different embodiments or examples and features of different embodiments or examples described in this specification may be combined if they do not conflict with each other.

Although the embodiments of the present disclosure have been shown and described above, it can be understood that the above embodiments are exemplary and should not be construed as limiting the present disclosure, and t variations, replacements and modifications to the above-described embodiments within the scope of the present disclosure.

What is claimed is:

1. A pixel circuit, comprising:

a driving transistor, configured to generate a driving signal;

a first reset module, configured to transmit, in response to a first reset control signal at a reset stage of the pixel circuit, a first reset voltage to a gate of the driving transistor;

a threshold compensation module, configured to electrically connect, in response to a threshold compensation control signal at a data writing stage of the pixel circuit, the gate of the driving transistor to an output terminal of the driving transistor; and a leakage current compensation module, configured to output, at a light-emitting control stage of the pixel circuit, a leakage current compensation voltage to the gate of the driving transistor, to control a potential change of the gate of the driving transistor to be opposite to a potential change caused by a leakage current at the gate of the driving transistor, wherein the leakage current compensation module comprises a compensation capacitor and a compensation voltage terminal, wherein a first electrode of the compensation capacitor is electrically connected to the gate of the driving transistor, and a second electrode of the compensation capacitor is electrically connected to the compensation voltage terminal, wherein the leakage current compensation module further comprises a compensation transistor electrically connected between the compensation capacitor and the compensation voltage terminal, wherein a first terminal of the compensation transistor is electrically connected to the compensation voltage terminal, a second terminal of the compensation transistor is electrically connected to the second electrode of the compensation capacitor, and a gate of the compensation transistor is provided with a compensation control signal.

2. The pixel circuit according to claim 1, further comprising:

an auxiliary reset module, configured to output an auxiliary reset voltage to the gate of the driving transistor at the reset stage, to control the potential change of the gate of the driving transistor to be opposite to a potential change caused by a leakage current at the gate of the driving transistor at the reset stage.

3. The pixel circuit according to claim 2, wherein the leakage current compensation module is reused as the auxiliary reset module, wherein the leakage current compensation module outputs the auxiliary reset voltage at the reset stage, and outputs the leakage current compensation voltage at the light-emitting control stage.

4. The pixel circuit according to claim 1, wherein throughout a first light-emitting control stage to an $N^{th}$ light-emitting control stage of the pixel circuit, voltage values outputted by the compensation voltage terminal in the respective stages are the same, wherein N is an integer greater than or equal to 2.

5. The pixel circuit according to claim 1, wherein throughout a first light-emitting control stage to an $N^{th}$ light-emitting control stage of the pixel circuit, a voltage value outputted by the compensation voltage terminal at an $i^{th}$ light-emitting control stage is an $i^{th}$ voltage value, wherein the $i^{th}$ voltage value is determined by a voltage of the gate of the driving transistor at the $i^{th}$ light-emitting control stage.

6. The pixel circuit according to claim 5, further comprising:

a voltage monitoring module electrically connected to the gate of the driving transistor and the compensation voltage terminal, and configured to monitor the voltage of the gate of the driving transistor at the light-emitting control stage and transmit the monitored voltage to the compensation voltage terminal, wherein the compensation voltage terminal outputs a corresponding voltage to the compensation capacitor according to the monitored voltage.

7. The pixel circuit according to claim 1, wherein the first reset module comprises a first reset transistor, wherein a first terminal of the first reset transistor is provided with the first reset voltage, a gate of the first reset transistor is provided with the first reset control signal, and a second terminal of the first reset transistor is electrically connected to the gate of the driving transistor; and the threshold compensation module comprises a threshold compensation transistor, wherein a first terminal of the threshold compensation transistor is electrically connected to the gate of the driving transistor, a second terminal of the threshold compensation transistor is electrically connected to an output terminal of the driving transistor, and a gate of the threshold compensation transistor is provided with the threshold compensation control signal.

8. The pixel circuit according to claim 7, wherein at least one of the first reset transistor and the threshold compensation transistor is a dual-gate transistor.

9. The pixel according to claim 7, wherein at least one of the first reset transistor and the threshold compensation transistor is an oxide transistor.

10. The pixel circuit according to claim 1, further comprising:

a data writing module, a light-emitting control module and a storage capacitor, wherein the data writing module is configured to transmit, in response to a data writing control signal at the data writing stage, a data voltage to an input terminal of the driving transistor, the light-emitting control module is configured to transmit, in response to a light-emitting control signal at the light-emitting stage, the driving signal generated by the driving transistor to a light-emitting element, wherein the light-emitting element emits light in response to the driving signal, and a first electrode of the storage capacitor is provided with a power supply voltage, and a second electrode of the storage capacitor is electrically connected to the gate of the driving transistor.

11. The pixel circuit according to claim 10, wherein the data writing module comprises a data writing transistor, wherein a first terminal of the data writing transistor is provided with the data voltage, a second terminal of the data writing transistor is electrically connected to the input terminal of the driving transistor, and a gate of the data writing transistor is provided with the data writing control signal; and the light-emitting control module comprises a first light-emitting control transistor and a second light-emitting control transistor, wherein a first terminal of the first light-emitting control transistor is provided with the power supply voltage, a second terminal of the first light-emitting control transistor is electrically connected to the input terminal of the driving transistor, and a gate of the first light-emitting control transistor is provided with the light-emitting control signal, a first terminal of the second light-emitting control transistor is electrically connected to an output terminal of the driving transistor, a second terminal of the second light-emitting control transistor is electrically connected to the light-emitting element, and a gate of the second light-emitting control transistor is provided with the light-emitting control signal.

12. The pixel circuit according to claim 10, further comprising:

a second reset module, configured to transmit, in response to a second reset control signal at the reset stage, a second reset voltage to a connection terminal of the light-emitting control module and the light-emitting element.

13. The pixel circuit according to claim 12, wherein the second reset module comprises a second reset transistor, wherein a first terminal of the second reset transistor is provided with the second reset voltage, a second terminal of the second reset transistor is electrically connected to the connection terminal of the light-emitting control module and the light-emitting element, and a gate of the second reset transistor is provided with the second reset control signal.

14. A driving method for a pixel circuit, applied to the pixel circuit according to claim 1, the driving method comprising:

outputting, by the leakage current compensation module at the light-emitting control stage of the pixel circuit, a leakage compensation voltage to the gate of the driving transistor, to control a potential change of the gate of the driving transistor to be opposite to a potential change caused by a leakage current at the gate of the driving transistor, wherein outputting the leakage compensation voltage to the gate of the driving transistor comprises:

turning on the compensation transistor in response to the compensation control signal at the light-emitting control stage.

15. The driving method according to claim 14, wherein the driving method comprises: a reset stage, a data writing stage and a light-emitting control stage that are performed in the sequence as listed, wherein at the reset stage, the first reset control signal enters an enabling stage, and controls the first reset module to transmit the first reset voltage to the gate of the driving transistor;

at the data writing stage, the threshold compensation control signal enters an enabling stage, and controls the threshold compensation module to electrically connect the gate of the driving transistor to the output terminal of the driving transistor; and at the light-emitting stage, the driving transistor generates the driving signal, and the leakage current compensation module outputs the leakage current compensation voltage to the gate of the driving transistor.

16. The driving method according to claim 15, wherein the pixel circuit further comprises an auxiliary reset module, wherein at the reset stage, the auxiliary reset module is configured to output an auxiliary reset voltage to the gate of the driving transistor, to control the potential change of the gate of the driving transistor to be opposite to a potential change caused by a leakage current at the gate of the driving transistor.

17. A display apparatus, comprising:

a pixel circuit, comprising:

a driving transistor, configured to generate a driving signal;

a first reset module, configured to transmit, in response to a first reset control signal at a reset stage of the pixel circuit, a first reset voltage to a gate of the driving transistor;

a threshold compensation module, configured to electrically connect, in response to a threshold compensation control signal at a data writing stage of the pixel circuit, the gate of the driving transistor to an output terminal of the driving transistor; and a leakage current compensation module, configured to output, at a light-emitting control stage of the pixel circuit, a leakage current compensation voltage to the gate of the driving transistor, to control a potential change of the gate of the driving transistor to be opposite to a potential change caused by a leakage current at the gate of the driving transistor, wherein the leakage current compensation module comprises a compensation capacitor and a compensation voltage terminal, wherein a first electrode of the compensation capacitor is electrically connected to the gate of the driving transistor, and a second electrode of the compensation capacitor is electrically connected to the compensation voltage terminal, wherein the leakage current compensation module further comprises a compensation transistor electrically connected between the compensation capacitor and the compensation voltage terminal, wherein a first terminal of the compensation transistor is electrically connected to the compensation voltage terminal, a second terminal of the compensation transistor is electrically connected to the second electrode of the compensation capacitor, and a gate of the compensation transistor is provided with a compensation control signal.

* * * * *